United States Patent
Vasudevan et al.

(10) Patent No.: US 8,489,102 B2
(45) Date of Patent: Jul. 16, 2013

(54) METHODS OF LOCATING, PAGING AND ROUTING CALLS TO WIRELESS USERS IN FEMTO SYSTEM

(75) Inventors: Subramanian Vasudevan, Morristown, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 790 days.

(21) Appl. No.: 11/907,455

(22) Filed: Oct. 12, 2007

(65) Prior Publication Data

US 2009/0098890 A1    Apr. 16, 2009

(51) Int. Cl.
*H04W 40/00* (2009.01)

(52) U.S. Cl.
USPC ........ 455/449; 455/453; 455/435.1; 455/445; 455/422.1; 455/458; 455/426.1; 455/515; 370/328

(58) Field of Classification Search
USPC .............. 455/453, 435.1, 445, 422.1, 458, 455/426.1, 515, 449; 370/328
See application file for complete search history.

(56) References Cited

U.S. PATENT DOCUMENTS

| | | |
|---|---|---|
| 5,548,816 A | 8/1996 | DeVaney |
| 5,613,198 A | 3/1997 | Ahmadi et al. |
| 5,757,913 A | 5/1998 | Bellare et al. |
| 6,356,758 B1 | 3/2002 | Almeida et al. |
| 6,415,032 B1 | 7/2002 | Doland |
| 6,920,504 B2 | 7/2005 | Bender et al. |
| 7,103,662 B2 | 9/2006 | Ray et al. |
| 2004/0266445 A1 | 12/2004 | Burgess et al. |
| 2005/0148368 A1* | 7/2005 | Scheinert et al. ............. 455/561 |
| 2005/0227693 A1 | 10/2005 | Kong et al. |
| 2007/0097939 A1 | 5/2007 | Nylander et al. |
| 2007/0105568 A1* | 5/2007 | Nylander et al. ............. 455/458 |
| 2007/0124368 A1 | 5/2007 | Weiser et al. |
| 2007/0140185 A1 | 6/2007 | Garg et al. |
| 2007/0160008 A1 | 7/2007 | Burgess |
| 2007/0183427 A1 | 8/2007 | Nylander et al. |
| 2007/0197220 A1 | 8/2007 | Willey |
| 2008/0004035 A1 | 1/2008 | Atkins |
| 2009/0086672 A1 | 4/2009 | Gholmieh et al. |

FOREIGN PATENT DOCUMENTS

| | | |
|---|---|---|
| CN | 1082273 | 2/1994 |
| CN | 1176729 | 3/1998 |
| CN | 1774136 | 6/2006 |
| EP | 1 608 187 | 12/2005 |

(Continued)

OTHER PUBLICATIONS

"cdma2000 High Rate Packet Data Air Interface Specification," 3rd Generation Partnership Project 2 "3GPP2," Version 2.0, Mar. 2007.

(Continued)

*Primary Examiner* — Vladimir Magloire
(74) *Attorney, Agent, or Firm* — Harness, Dickey & Pierce, P.L.C.

(57) ABSTRACT

In a method for locating a mobile station, a first sub-paging zone for paging the mobile station is selected in response to an incoming call intended for the mobile station if a trigger code associated with a first femto cell matches a first trigger code associated with femto cells included in the first sub-paging zone. The first femto cell is a femto cell with which the mobile station has most recently registered. The first sub-paging zone is defined based on a location of ones of a subset of the plurality of femto cells. The mobile station within the first sub-paging zone is paged to locate the mobile station.

17 Claims, 4 Drawing Sheets

FOREIGN PATENT DOCUMENTS

| | | |
|---|---|---|
| EP | 1 657 949 | 5/2006 |
| EP | 1 821 560 | 8/2007 |
| JP | 10-51846 | 2/1998 |
| JP | 2005348246 A | 12/2005 |
| JP | 2006-141026 | 6/2006 |
| JP | 2007-221777 | 8/2007 |
| WO | WO 93/23965 | 11/1993 |
| WO | WO 00/28770 | 5/2000 |
| WO | WO 01/67786 | 9/2001 |
| WO | WO 2006/094253 | 9/2006 |
| WO | WO 2007/040449 | 4/2007 |
| WO | WO 2007/040452 | 4/2007 |

OTHER PUBLICATIONS

Kim et al., "An Efficient Paging Scheme for Overlaid Microcell/Macrocell Systems," Universal Personal Communications, vol. 2, pp. 961-964, Sep. 29, 1996.

US Office Action, dated Jun. 28, 2011, issued in co-pending U.S. Appl. No. 11/984,400.

US Office Action, dated Jul. 13, 2011, issued in co-pending U.S. Appl. No. 12/007,425.

Chinese Notification of the First Office Action dated Jun. 29, 2012 issued in Application No. CN 200880111029. and English Translation thereof.

English translation of Japanese Office Action dated Jan. 30, 2012.

Office Action dated Apr. 28, 2012 by the Chinese Patent Office for Application No. 2008-80110898.0.

US Notice of Allowance, dated Nov. 26, 2010, issued in co-pending U.S. Appl. No. 11/907,458.

US Office Action, dated Dec. 22, 2010, issued in co-pending U.S. Appl. No. 12/007,425.

US Office Action dated Nov. 16, 2012, issued in co-pending U.S. Appl. No. 12/007,425.

English translation of Japanese Office Action for corresponding Japanese Application No. 2010-528873 dated Oct. 25, 2013.

Japanese Office Action and English translation thereof dated Mar. 12, 2012.

* cited by examiner

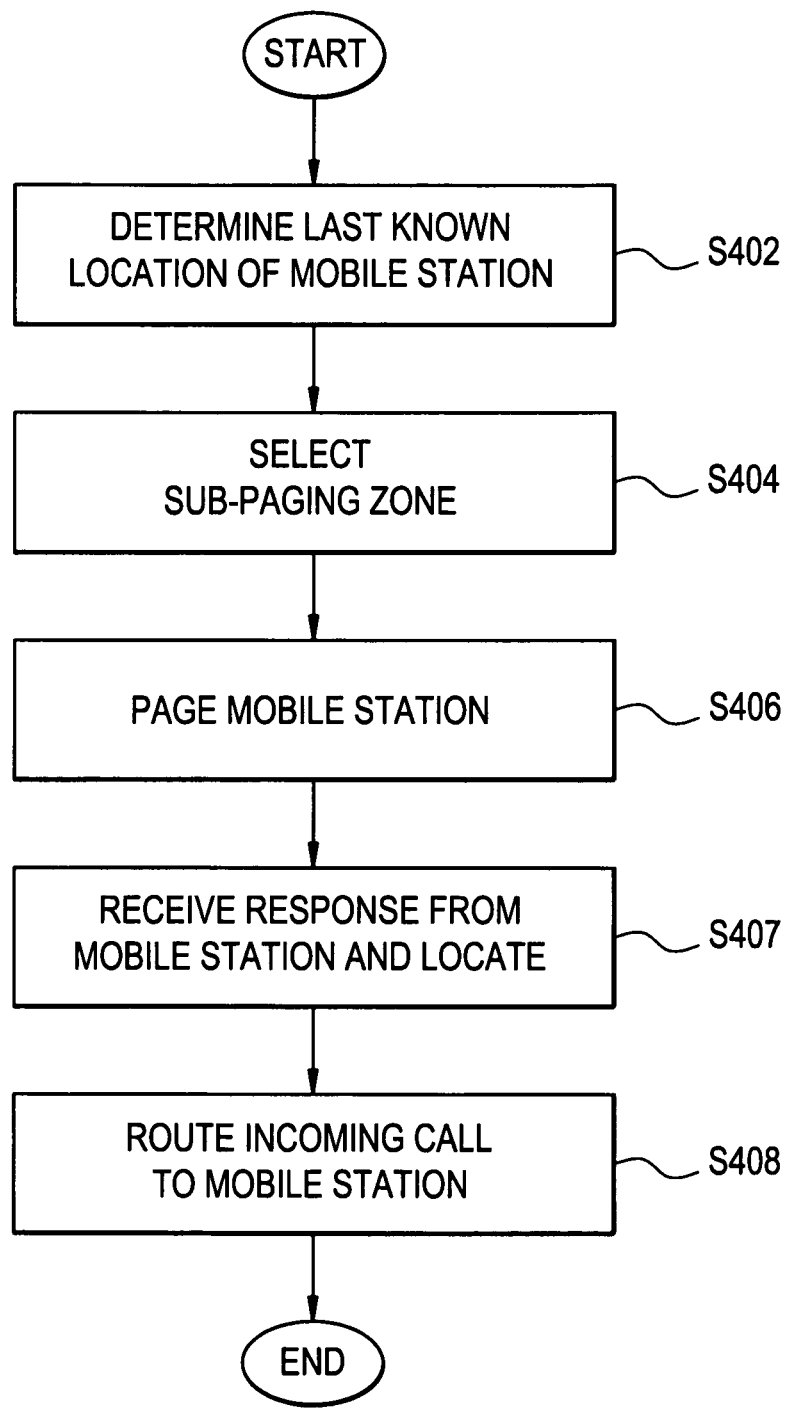

METHODS OF LOCATING, PAGING AND ROUTING CALLS TO WIRELESS USERS IN FEMTO SYSTEM

BACKGROUND OF THE INVENTION

A femto base station is basically a low cost and low power base station (BS) transceiver which is installed indoors (e.g., in a home or office) and connected to the Internet via cable, DSL, on-premise fiber optic link, or a similar IP backhaul technology. This connection is used to integrate the femto base station with the WAN wireless operator's core network.

A femto base station serves a geographic area known as a femto cell over a single carrier or channel. A femto cell typically covers a smaller geographic area or subscriber constituency than a conventional macro cell. For, example, femto base stations typically provide radio coverage in geographical areas such as one or more buildings or homes, whereas conventional macro base stations provide radio coverage in larger areas such as an entire cities or towns. The function of femto cells is similar to that of a Wireless LAN (Local Area Network). It provides the operators a low cost solution for coverage extension and for offloading users from the cellular network.

In a wireless network including femto cells, for example, upon entering a cell (femto, macro, etc.), a mobile station in an idle state receives broadcast overhead messages such as a sector-parameters message on the well-known broadcast control channel. In the current 3GPP2 CDMA2000 EVDO standards, (e.g., "cdma2000 High Rate Packet Data Air Interface Specification," 3GPP2 C.S0024-B, Ver. 2.0 (March 2007)), broadcast sector-parameters include trigger codes.

Conventionally, a trigger code is transmitted to the mobile station by a serving base station. The mobile station uses the trigger code to identify a configuration of the serving base station. For example, a trigger code indicates to the mobile station which communication standard version (e.g., Revision 0, Revision A, etc. of the EVDO standard) is being used by the system covering a certain area. That is, the system including the serving base station.

In the idle mode, the mobile station periodically monitors ("wakes up" and receives) the broadcast control channel for changes in received sector-parameters such as the trigger code. Each time a mobile station crosses into a new cell and receives a new trigger code, the new trigger code triggers re-registration of the mobile station. That is, for example, a new trigger code causes the mobile station to send a registration message to the radio access network (RAN). If necessary, the mobile station adapts to the different standard versions of the newly entered cell in response to the new trigger code. The mobile station adapts to the different standard versions by negotiating a new set of configuration parameters (new personality). Conventionally, however, trigger codes are not used to identify an area in which to page a mobile station (hereinafter a paging area) in response to an incoming call. Instead, conventional radius-based idle registration is used.

In conventional radius-based idle registration, the mobile station calculates the distance between itself and the current serving base station and itself and the base station to which the mobile station has most recently registered (previous serving base station). If a distance between the mobile and the previous serving base station is less than a given threshold distance, the mobile does not send location update registration.

If a distance between the mobile and the previous serving base station is greater than the given threshold, the mobile sends location update registration. Location update registration is well-known in the art, and thus, a detailed discussion will be omitted for the sake of brevity.

If the mobile station does not send the location update registration, the RAN determines that the mobile is located within a given radial distance (or radial coverage area) from the previous serving base station.

After determining the appropriate paging area, the RAN pages the mobile station. Paging is used to locate the mobile station within a cell so that the RAN may route the incoming call. When paging the mobile station, the RAN pages all cells within the determined paging area. Because femto cells are usually quite small, however, a femto subnet or femto space may include, for example, hundreds of femto cells. Consequently, using radius-based idle registration, paging of a mobile station in a femto cell environment may require paging hundreds of femto cells. This may result in unnecessary traffic.

Further, as is well-known, femto cell coverage may be irregularly shaped. Consequently, at certain locations there may be a relatively large number of femto cells within a given radial coverage area, whereas at other locations there may be relatively few femto cells within a paging area. Moreover, radius based paging zones are determined by grouping cells covering the same area within a given radius. As a result, the number of the cells in a paging zone may vary substantially depending on the shape and the density of different coverage areas.

Further still, in the above-described current EVDO standards, only two-dimensional location information is broadcast by each base station. Thus, using radius based-idle registration in a femto subnet or femto space in which the femto cellular coverage is vertically deployed may also produce unnecessary paging traffic.

SUMMARY OF THE INVENTION

Illustrative embodiments provide methods of updating location, paging and routing calls to wireless users in a femto system.

In a method for routing a call in a wireless network, a plurality of sub-paging zones may be defined based on a location of ones of a subset of the plurality of femto cells. A trigger code may be associated with each defined sub-paging zone. An incoming call may be routed to a mobile station based on a trigger code associated with a femto cell with which the mobile station has most recently registered. The plurality of sub-paging zones may be further defined based on a spatial distribution of the plurality of femto cells in the wireless network.

In a method for configuring a wireless network, a plurality of femto cells may be grouped into sub-paging zones based on a location of each of the plurality of femto cells and a distribution of the plurality of femto cells within the wireless network. A unique trigger code may be assigned to each of the plurality of sub-paging zones.

Upon receipt of an incoming call destined for the mobile station, one of the plurality of sub-paging zones may be selected based on a trigger code associated with a femto cell with which the mobile station has most recently registered, and the selected sub-paging zone may be paged to locate the mobile station.

In another method, a first sub-paging zone may be defined based on a location of ones of a subset of a plurality of femto cells, the first sub-paging zone including a portion of the plurality of femto cells. A same first trigger code may be associated with each of the femto cells in the first sub-paging zone. The first sub-paging zone may also be defined based on a spatial distribution of the plurality of femto cells in the wireless network.

The first sub-paging zone may be selected for paging the mobile station in response to an incoming call intended for the mobile station if the trigger code associated with a femto cell with which the mobile station has most recently registered matches the first trigger code associated with femto cells included in the first sub-paging zone. The mobile station may then be paged within the first sub-paging zone to identify which of the plurality of femto cells the mobile station is served by if the selecting step selects the first sub-paging zone.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 4 illustrates a method for paging a mobile station according to an illustrative embodiment.

DETAILED DESCRIPTION OF THE EMBODIMENTS

In the following description, for purposes of explanation and not limitation, specific details are set forth such as particular architectures, interfaces, techniques, etc., in order to provide a thorough understanding of the present invention. However, it will be apparent to those skilled in the art that the present invention may be practiced in other illustrative embodiments that depart from these specific details. In some instances, detailed descriptions of well-known devices, circuits, and methods are omitted so as not to obscure the description of the present invention with unnecessary detail. All principles, aspects, and embodiments of the present invention, as well as specific examples thereof, are intended to encompass both structural and functional equivalents thereof. Additionally, it is intended that such equivalents include both currently known equivalents as well as equivalents developed in the future.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware at existing radio network control nodes such as a femto management system (FMS).

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

As discussed herein, the term "user" may be considered synonymous to, and used interchangeably with, the term "mobile station."

Figure 1:
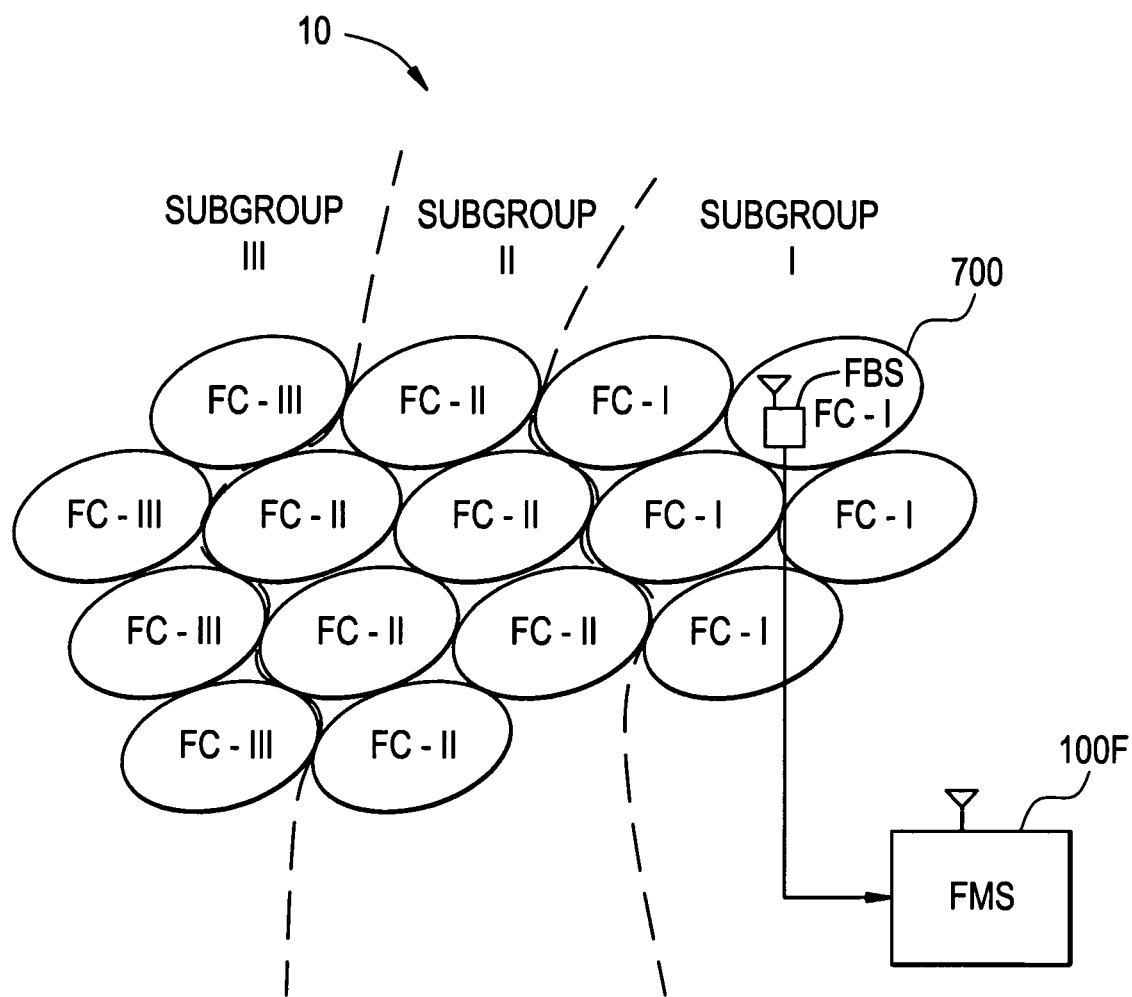
FIG. 1 illustrates a portion of a telecommunications system in which illustrative embodiments may be implemented.

FIG. 1 illustrates a portion of a telecommunications system in which illustrative embodiments may be implemented. The telecommunications system 10 includes a radio access network (RAN).

The RAN shown in FIG. 1 is, by way of non-limiting example, a code division multiple access radio access network (CDMA RAN). In a CDMA RAN, radio access is preferably based upon CDMA with individual radio channels allocated using CDMA spreading codes. Of course, other access methods may be employed.

The RAN in FIG. 1 may include a plurality of first femto cells FC-I, a plurality of second femto cells FC-II and a plurality of third femto cells FC-III. Each of the plurality of femto cells includes a femto base station FBS located therein. For the sake of clarity, however, only a single femto base station FBS is illustrated in FIG. 1. Each femto cell is identified by a unique identity, which is broadcast within the cell. As used herein, the phrase "femto base station" may be synonymous with "pico base station" or "micro base station."

The RAN may further include a femto management system (FMS) 100F. The FMS 100F is analogous to and has the same or substantially the same functionality as a RAN control node (e.g., a radio network controller (RNC)) in a macro system. Because such functionality is well-known, a detailed discussion will be omitted for the sake of brevity.

Although not explicitly shown in FIG. 1, the FMS 100F may maintain a separate link with each femto base station in the femto telecommunications system 10. The link between the FMS 100F and the femto base stations may traverse one or more packet and/or circuit switched networks (e.g., one or more Internet Protocol (IP) networks or the like).

The nodes 100F and FBS are termed an FMS and femto base station in keeping with the CDMA RAN example. However, it should be understood that the terms femto management system and base station also encompass nodes having similar functionality for other types of RANs. Other types of telecommunications systems which encompass other types of radio access networks include the following: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; Worldwide Interoperability for Microwave Access (WiMAX); ultra mobile broadband (UMB); long term evolution (LTE), etc.

For the sake of example, FIG. 1 shows only a single FMS 100F and a limited number of femto cells. However, it will be understood that exemplary embodiments may be implemented in RANs including any number of FMSs, femto cells and/or femto base stations.

Referring still to FIG. 1, as is well-known, a mobile station (not shown) may communicate with one or more femto base stations over an air interface. As discussed herein, a mobile station may be, for example, a mobile telephone ("cellular" telephone), a portable computer, pocket computer, hand-held computer, a personal digital assistant (PDA), a car-mounted mobile device, or the like, which communicates voice and/or data with the RAN.

Exemplary embodiments provide methods for more efficient locating and paging of mobile stations, and routing of incoming calls in a femto system or environment.

Figure 2:
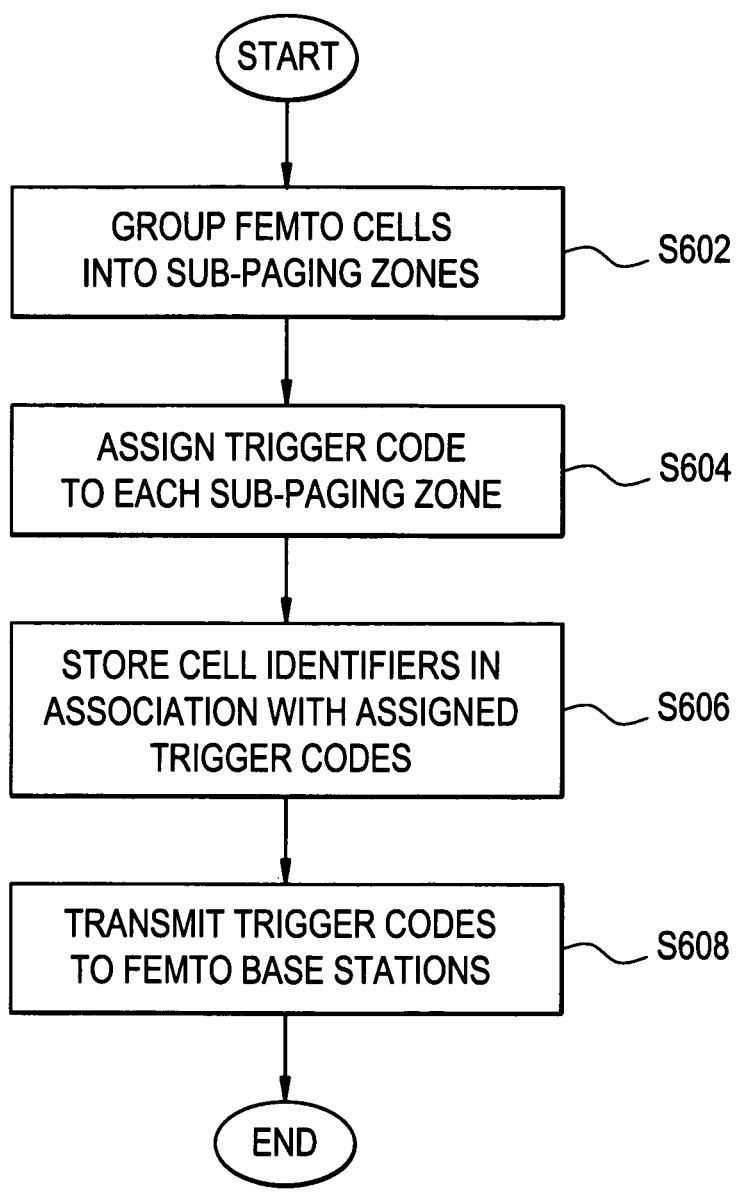
FIG. 2 illustrates a method for assigning trigger codes to sub-groups of femto cells in a femto cell environment.

FIG. 2 illustrates a method for assigning trigger codes to sub-groups (hereinafter referred to as sub-paging zones) of femto cells in a femto cell system (e.g., such as cells serving users in an office or apartment complex) to facilitate paging of mobile stations. For example purposes, the method shown in FIG. 2 will be described with regard to the RAN shown in FIG. 1.

The steps shown in the method of FIG. 2 may be performed by the RAN, for example, by a paging manager. As is well-known, the paging manager may be located at the FMS 100F.

Referring to FIG. 2, at step S602 the FMS 100F may define a plurality of sub-paging zones based on location of the femto cells within the femto space and a spatial distribution of the femto cells within the femto space. In doing so, femto cells geographically close to each other may be grouped together in a single sub-paging zone. Each of the plurality of sub-paging zones may include a plurality of femto cells.

In one example, the FMS 100F may define the sub-paging zones by grouping the femto cells into sub-paging zones according to femto cell identifiers for each femto cell. The sub-paging zones may contain similar numbers of femto cells. Thus, while femto cells in close geographical proximity may be grouped together, the groupings of femto cells may be based on the number of cells rather than the size of the coverage area of the cells. Cells providing coverage areas of different sizes may be grouped together in a sub-paging zone.

In one embodiment, when a new femto cell is added to the network, the FMS 100F is notified and includes the newly added femto cell in a sub-paging zone based on the location of the newly added femto cell and the size of neighboring sub-paging zones. If the newly added femto cell is close to or equidistant from more than one sub-paging zone, the new femto cell may be added to the sub-paging zones having a fewer number of femto cells.

If a sub-paging zone includes too many femto cells, for example, as a result of adding new femto cells, the sub-paging zone may be split into two or more sub-paging zones. In one embodiment, a sub-paging zone may be split into two or more sub-paging zones if the number of femto cells in the sub-paging zone exceeds a given threshold. The given threshold may be determined, for example, by a network operator based on characteristics of the RAN. The sizes of the sub-paging zones may be monitored by the paging manager.

In a more specific example, the defining of sub-paging zones in a coverage space such as a building may depend on the shape of the building and the density of the femto cells in different areas of the building (e.g., on a floor by floor basis, etc.).

Referring back to FIG. 1, for example, the FMS 100F may group the plurality of first femto cells FC-I into first sub-paging zone I, the plurality of second femto cells FC-II into a second sub-paging zone II, and the third plurality of femto cells FC-III into a third sub-paging zone III. Sub-paging zones may also be referred to as sub-groups of femto cells.

Returning to FIG. 2, after grouping the femto cells into sub-paging zones, the FMS 100F may assign a trigger code to each sub-paging zone I, II and III at step S604. In doing so, each femto cell FC-I in the first sub-paging zone I may be associated with a first trigger code, each femto cell FC-II in the second sub-paging zone II may be associated with a second trigger code, and each femto cell FC-III in the third sub-paging zone III may be associated with a third trigger code.

At step S606, the assigned trigger codes may be stored in association with identification of the femto cells included in each sub-paging zone. In one example, the assigned trigger codes and cell identification information (e.g., well-known femto cell or sector identifiers) may be stored in a database at FMS 100F. The database may be managed by the paging manager. The cells with the same trigger code constitute a sub-paging zone.

At step S608, the assigned trigger codes may be distributed to corresponding femto base stations in any well-known manner.

Upon receipt, a femto base station broadcasts the received trigger code in a sector-parameters message on the broadcast control channel in any well-known manner. Mobile stations may utilize the broadcast trigger codes to trigger re-registration of the mobile station as described above.

Figure 3:
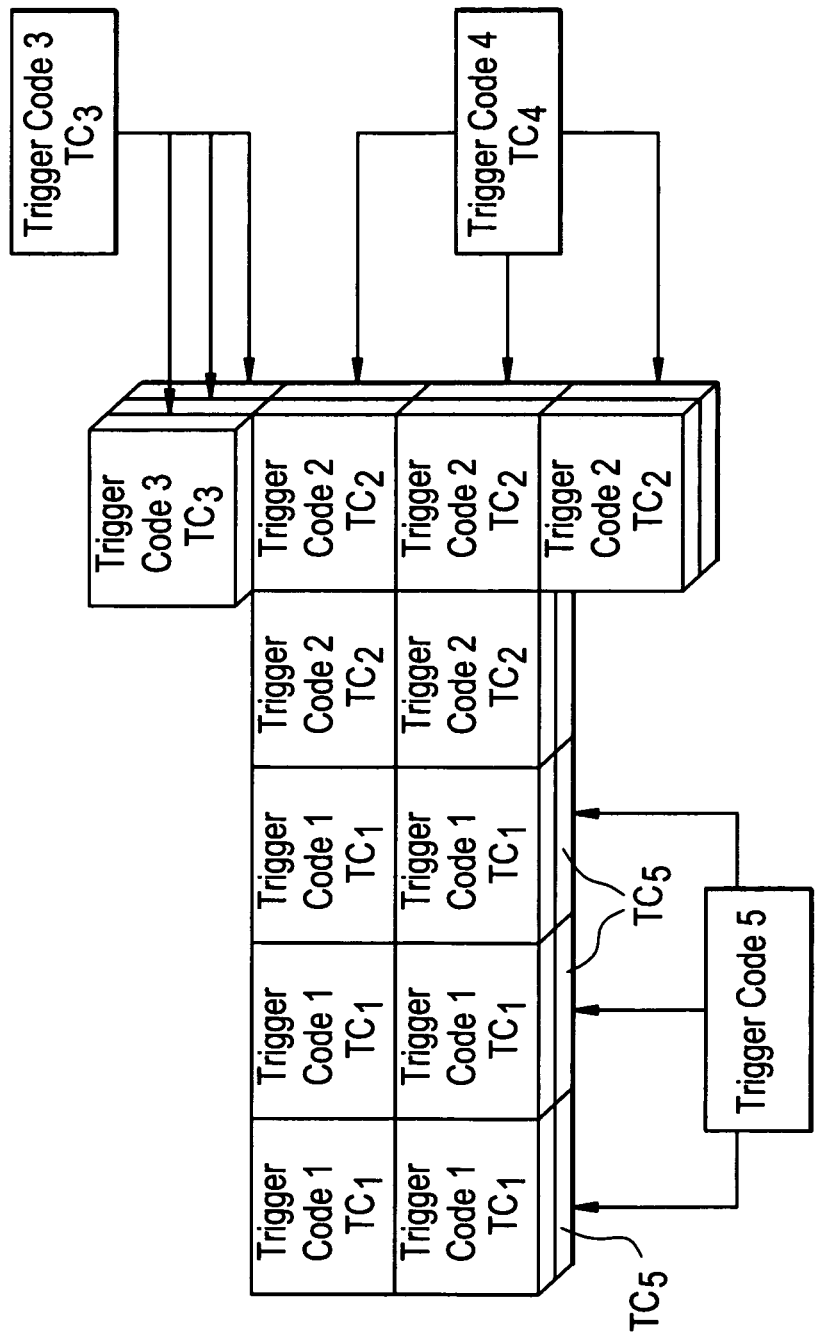
FIG. 3 illustrates an exemplary trigger code distribution within a femto space such as a building.

FIG. 3 illustrates a more specific example of sub-paging zone grouping and trigger code assignment within a building.

Referring to FIG. 3, femto cells TC1 are femto cells covering a first group of adjacent rooms on a second floor of the building. Femto cells TC2 are femto cells covering a second group of adjacent rooms on the second floor of the building. Femto cells TC3 are femto cells covering rooms on vertically adjacent floors of the building. Femto cells TC4 are femto cells covering a first group of adjacent rooms on the first floor of the building. Femto cells TC5 are femto cells covering a second group of adjacent rooms on the first floor of the building.

According to the illustrative embodiments described herein, the FMS 100F may define a first sub-paging zone as including femto cells TC1 and assign a first trigger code (Trigger Code 1) to the first sub-paging zone. In doing so, the FMS 100F associates the first trigger code (Trigger Code 1) with each of the plurality of femto cells within the first sub-paging zone.

In a similar manner, the FMS 100F defines a second, third, fourth and fifth sub-paging zones as including femto cells TC2, TC3, TC4 and TC5, respectively. The FMS 100F then assigns second, third, fourth and fifth trigger codes (Trigger Code 2, Trigger Code 3, Trigger Code 4 and Trigger Code 5) to the second, third, fourth and fifth sub-paging zones, respectively.

FIG. 4 illustrates a method for routing an incoming call (e.g., data, voice, etc.) to a mobile station according to an exemplary embodiment. The method of FIG. 4 will be described with regard to the RAN shown in FIG. 1. For the purposes of this discussion, it is assumed a mobile station is located in sub-paging zone I of FIG. 1.

As described above, upon receiving a call request intended for a mobile station (not shown) in the wireless network (e.g., the RAN of FIG. 1), the FMS 100F must page appropriate cells to locate and route the incoming call.

Referring to FIG. 4, upon receiving the incoming call for the mobile station, the FMS 100F may determine the last known location of the mobile station at step S402. The last known location of the mobile station may be determined by identifying the femto base station with which the mobile station has most recently registered (hereinafter the most recent femto cell). In other words, for example, the last known location of the mobile station is determined based on the destination femto cell of a last registration message sent by the mobile station. The femto cell that has received the most recent registration message from the mobile station may be known at the FMS 100F.

After determining the last known location of the mobile station, the FMS 100F may select a sub-paging zone for paging the mobile station at step S404. The FMS 100F selects a sub-paging zone including a group of femto cells associated with the same trigger code as the femto cell receiving the most recent registration message.

Referring still to FIG. 1, for example, assuming the last known location of the mobile station was within femto cell 700 of FIG. 1, the FMS 100F may access the above-described database (via the paging manager) to select sub-paging zone I because femto cell 700 is in sub-paging zone I, and each of the plurality of femto cells within the sub-paging zone I are associated with the same trigger code as the femto cell 700.

At step S406, the FMS 100F sends paging messages to the mobile station only via the femto cells in sub-paging zone I to locate the mobile station. At step S407, the FMS 100F receives a paging response from the mobile station, and locates the femto cell in which the mobile station currently resides based on the paging response. The paging response is generated by the mobile station in response to the paging message from the FMS 100F.

At step S408, after locating the femto cell in which the mobile station resides, the FMS 100F may route the incoming call through the femto base station corresponding to the femto cell in which the mobile station resides. Routing of the incoming call may be performed in any well-known manner.

By using trigger codes to define sub-paging zones, as described herein, femto coverage spaces for irregular shaped spaces may be adapted more easily. Paging efficiency may also be improved in a manageable fashion, and ping-pong effects may be suppressed and/or alleviated by the existing spatial hysteresis mechanism of the trigger code.

The invention being thus described, it will be obvious that the same may be varied in many ways. Such variations are not to be regarded as a departure from the invention, and all such modifications are intended to be included within the scope of the invention.

We claim:

1. A method for configuring a wireless network including a plurality of femto cells, the method comprising:
    defining, by a network element, a first sub-paging zone based on a location of ones of a subset of the plurality of femto cells within a femto cell system;
    associating, by the network element, a same first trigger code with each of the femto cells in the first sub-paging zone within the femto cell system, a first trigger code being a code that triggers registration of a mobile station with one of the plurality of femto cells in the first sub-paging zone;
    adding a femto cell to the first sub-paging zone;
    splitting the first sub-paging zone into at least two sub-paging zones based on a location and spatial distribution of the femto cells in the first sub-paging zone;
    associating the same first trigger code with each of the femto cells in a first one of the at least two sub-paging zones; and
    associating a same second trigger code with each of the femto cells in a second one of the at least two sub-paging zones.

2. The method of claim 1, wherein the first sub-paging zone includes a plurality of femto cells in close proximity to one another.

3. The method of claim 1, further comprising:
    selecting the first sub-paging zone for paging the mobile station in response to an incoming call intended for the mobile station if the trigger code associated with a first femto cell matches the first trigger code associated with femto cells included in the first sub-paging zone, the first femto cell being a femto cell with which the mobile station has most recently registered; and
    paging the mobile station within the first sub-paging zone to locate the mobile station if the selecting step selects the first sub-paging zone.

4. The method of claim 3, further comprising:
    routing the incoming call to the mobile station according to the location of the mobile station.

5. The method of claim 1, wherein the defining step further defines a second sub-paging zone, the second sub-paging zone including a second portion of the plurality of femto cells, each of the femto cells included in the second sub-paging zone being associated with a same third trigger code.

6. The method of claim 5, further comprising:
    selecting one of the first and second sub-paging zones based on the trigger code associated with a first femto cell.

7. The method of claim 6, further comprising:
    paging the mobile station within the first or second sub paging zone, based on the selecting, to locate the mobile station.

8. The method of claim 7, further comprising:
    routing an incoming call to the mobile station based on the paging step.

9. The method of claim 5, further comprising:
    first storing, in a database at a paging manager, the first trigger code in association with femto cell identifiers for the femto cells in the first sub-paging zone; and
    second storing, in the database, the third trigger code in association with femto cell identifiers for the femto cells in the second sub-paging zone.

10. The method of claim 5, wherein each of the first and second sub-paging zones include a plurality of femto cells in close proximity to one another.

11. The method of claim 1, further comprising:
    storing, in association with the same first trigger code, femto cell identifiers for each of the plurality of femto cells in the first sub-paging zone.

12. The method of claim 5, wherein the defining step defines the first and second sub-paging zones such that the sub-paging zones include substantially the same number of femto cells.

13. The method of claim 1, wherein the defining step further defines the first sub-paging zone based on a spatial distribution of the plurality of femto cells in the wireless network.

14. A method for locating a mobile station in a wireless network including a plurality of femto cells, the method comprising:
    selecting, by a network element, a first sub-paging zone for paging the mobile station in response to an incoming call intended for the mobile station if a trigger code associated with a first femto cell matches a first trigger code associated with femto cells included in the first sub-paging zone, the first femto cell being a femto cell with which the mobile station has most recently registered, the first sub-paging zone being a subset of the plurality of femto cells and defined based on a location of each of the plurality of femto cells, and the first trigger code being a code that triggers registration of a mobile station with one of the plurality of femto cells in the first sub-paging zone;

adding a femto cell to the first sub-paging zone;
splitting the first sub-paging zone into a second sub-paging zone and a third sub-paging zone based on a location and spatial distribution of the femto cells in the first sub-paging zone;
associating the same first trigger code with each of the femto cells in the second sub-paging zone;
associating a same second trigger code with each of the femto cells in the third sub-paging zone; and
paging, by a network element, the mobile station within the first sub-paging zone to locate the mobile station if the selecting step selects the first sub-paging zone.

15. The method of claim 14, wherein the first sub-paging zone being is further defined based on a spatial distribution of the plurality of femto cells in the wireless network.

16. The method of claim 14, further comprising:
routing an incoming call to the mobile station based on the paging step.

17. The method of claim 14, wherein the first sub-paging zone includes a plurality of femto cells in close proximity to one another.

\* \* \* \* \*